United States Patent [19]

Wall et al.

[11] Patent Number: 5,651,629

[45] Date of Patent: Jul. 29, 1997

[54] COUPLING DEVICE FOR DRIVE SHAFTS

[76] Inventors: Harry Wall, P.O. Box 165; Nowal Pierson, P.O. Box 29, both of Vauxhall, Alberta, Canada, T0K 2K0

[21] Appl. No.: 634,041

[22] Filed: Apr. 17, 1996

[51] Int. Cl.$^6$ .................................................. F16D 9/06
[52] U.S. Cl. ........................... 403/2; 403/315; 403/337; 464/33
[58] Field of Search ........................... 403/2, 335, 339, 403/315, 319; 464/32, 33

[56] References Cited

U.S. PATENT DOCUMENTS

| | | | |
|---|---|---|---|
| 1,637,944 | 8/1927 | Keller . | |
| 1,820,750 | 8/1931 | Lord . | |
| 1,940,866 | 12/1933 | Rosenberg | 64/96 |
| 2,083,054 | 6/1937 | Cline | 285/139 |
| 2,084,862 | 6/1937 | Moser | 287/129 |
| 2,585,113 | 2/1952 | Gredell | 403/2 X |
| 2,666,394 | 1/1954 | Sadler et al. | 103/117 |
| 2,748,578 | 6/1956 | Potts | 64/28 |
| 2,756,018 | 7/1956 | Casacci | 253/22 |
| 2,879,092 | 3/1959 | Hargrove et al. | 287/129 |
| 3,858,987 | 1/1975 | Kleinhans et al. | 403/2 |
| 4,028,909 | 6/1977 | Jancic et al. | 64/28 R |
| 4,318,284 | 3/1982 | van der Lely et al. | 64/28 R |
| 4,447,217 | 5/1984 | Blandford | 403/2 X |
| 4,607,971 | 8/1986 | Hartmann et al. | 464/32 X |
| 4,923,319 | 5/1990 | Dent | 403/2 |

FOREIGN PATENT DOCUMENTS

| | | | |
|---|---|---|---|
| 71251 | 6/1979 | Japan | 464/33 |
| 475471 | 6/1975 | U.S.S.R. | 464/33 |
| 826121 | 5/1981 | U.S.S.R. | 464/33 |
| 794956 | 5/1958 | United Kingdom | 464/33 |

*Primary Examiner*—Harry C. Kim
*Attorney, Agent, or Firm*—Thomas E. Malyszko

[57] ABSTRACT

A device for connecting the ends of two aligned sections of a hollow drive shaft which are rotatable about a common axis has first and second coupling members for securing to the ends of the drive shaft sections. At least two shearable bolts or pins connect the coupling members for transmitting torque between the drive shaft sections during operation and are arranged for balanced rotation of the coupling members under high r.p.m. conditions. The bolts, and not the drive shaft, will shear when the coupling members are subjected to a predetermined overload condition. The coupling members also include an annular groove and a correspondingly shaped annular projection for maintaining the shaft sections in axial alignment upon shearing of the bolts, and a collar for preventing the collapse of the shaft sections by restricting axial movement of the coupling members upon shearing of the bolts.

15 Claims, 2 Drawing Sheets

COUPLING DEVICE FOR DRIVE SHAFTS

FIELD OF THE INVENTION

The present invention relates to a coupling device, and in particular to a device employing shearable connectors for coupling two sections of a drive shaft.

BACKGROUND OF THE INVENTION

Drive shafts, sometimes also referred to as power take-offs or power trains, frequently snap in conventional heavy duty equipment and vehicles, such as large trucks for hauling heavy loads. Breaks are commonly caused when an excessive load or torque is exerted on the shaft by the prime mover, namely by the engine through the transmission. These breaks are very costly to businesses, resulting in lost productivity, long delays and unnecessary expenses. It takes considerable time to transport such large vehicles to repair shops, to remove and replace the broken drive shafts, and then to return the vehicles to their original work locations. A broken drive shaft can also cause collateral damage to other vehicle parts when it collapses while the vehicle is moving.

Various devices have been proposed to avoid rupture of assorted shafts. The devices link together two parts of the rotatable shaft and provide a means for severing the connection when a certain load condition is reached which is below the breaking point of the shaft. Such prior devices typically employ a form of shear pin connection, examples of which may be found in U.S. Pat. No. 1,637,944 (Keller), U.S. Pat. No. 2,666,394 (Sadler et al), U.S. Pat. No. 2,748,578 (Potts) and U.S. Pat. No. 4,3 18,284 (van der Lely et al).

However, these prior coupling devices suffer from at least some of the following disadvantages. One disadvantage is that linkage to the coupling device requires a shaft ends with a particular configuration or finish, such as a notched spline shaft in van der Lely, a threaded end in Potts or an end with an integral circumferential flange as in Keller. The prior devices are not capable of being connected or retro-fitted onto the end of a plainly cut drive shaft, or would require substantial modification of such shall Another disadvantage of prior devices is their unsuitability for use with shafts subjected to high r.p.m. (revolutions per minute), namely up to about 2500 r.p.m. Such high speeds require the elements of a coupling device to be balanced about the axis of rotation to avoid wobbling or vibration. The prior devices lack necessary symmetry about the axis of rotation to provide balanced rotation, and so are usually restricted to lower r.p.m., namely up to about 1100 r.p.m., such as in farm bailing machines and tractors. In part this is due to their typically complex construction requiring many individual parts, which also increases manufacturing cost of the devices.

Yet another disadvantage is the difficulty of re-establishing a driving connection between shaft sections upon overload of the coupling devices. Some devices require removal of shrouds or the like before a shear pin member may be accessed. Some allow the shaft sections to loose their axial alignment or to collapse, making it difficult or impossible for a single operator to re-establish a driving connection.

What is desired therefore is a novel device for coupling two sections of a drive shaft which overcomes the limitations and disadvantages of these other prior coupling devices. Preferably it should provide a simple and low cost manner of connecting two sections of a drive shaft for balanced rotation at high r.p.m., and allow for convenient installation on any drive shaft surface without substantial modification or alteration thereof. Preferably it should prevent the drive shaft sections from collapsing upon overload of the coupling device, and should maintain the shaft sections in axial alignment to allow driving connection to be quickly re-established with minimal exertion.

SUMMARY OF THE INVENTION

In a preferred aspect the invention provides a device for connecting the ends of first and second aligned sections of a hollow drive shaft rotatable about a common axis, said device comprising:
- a first coupling member for securing to the end of said first drive shaft section and a second coupling member for securing to the end of said second drive shaft section, said first and second coupling members being relatively rotatable about said common axis;
- at least two shearable connectors for connecting said first and second coupling members and for transmitting torque between said first and second drive shaft sections during operation, said connectors arranged for balanced common rotation of said first and second coupling members, and wherein said connectors, and not the drive shall sections, will rupture when said coupling members are subjected to an overload condition; and
- said first and second coupling members further including:
  - retaining means for maintaining said first and second shaft sections in axial alignment upon rupture of said connectors; and
  - stop means for preventing collapse of said shaft sections by restricting relative axial movement of said coupling members upon rupture of said connectors.

In another aspect the invention provides a coupling device for establishing a shearable driving connection between a first drive shaft section and a second drive shaft section comprising:
- a first coupling member adapted to be secured to said first drive shaft section;
- a second coupling member adapted to be secured to said second drive shaft section;
- means for connecting said first and second coupling members for balanced rotation to at least 2500 r.p.m. about an axis common with said first and second drive shaft sections, said connecting means adapted to shear upon said coupling members being subjected to a predetermined overload condition;
- said first and second coupling members further including:
  - retaining means for maintaining said first and second shaft sections in axial alignment upon shearing of said connecting means; and
  - stop means to maintain said coupling members in an abutting relationship and to prevent collapse of said shaft sections upon shearing of said connecting means.

DESCRIPTION OF THE DRAWINGS

Embodiments of the invention will now be described, by way of example only, with reference to the accompanying drawings, wherein.

DESCRIPTION OF PREFERRED EMBODIMENTS

Figure 1:
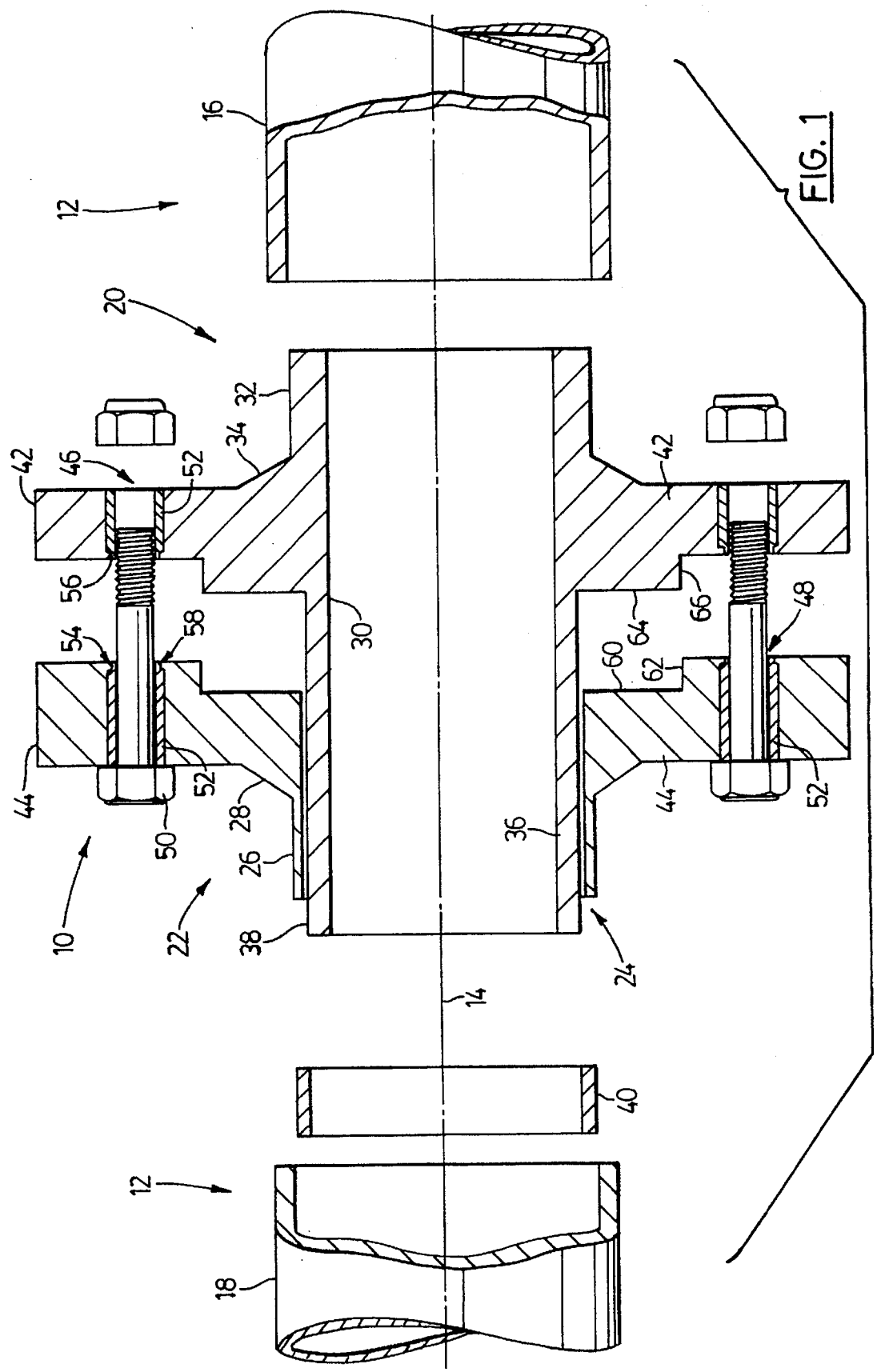
FIG. 1 is an exploded sectional view of a preferred embodiment of a coupling device of the present invention and two sections of a drive shaft.
Figure 2:
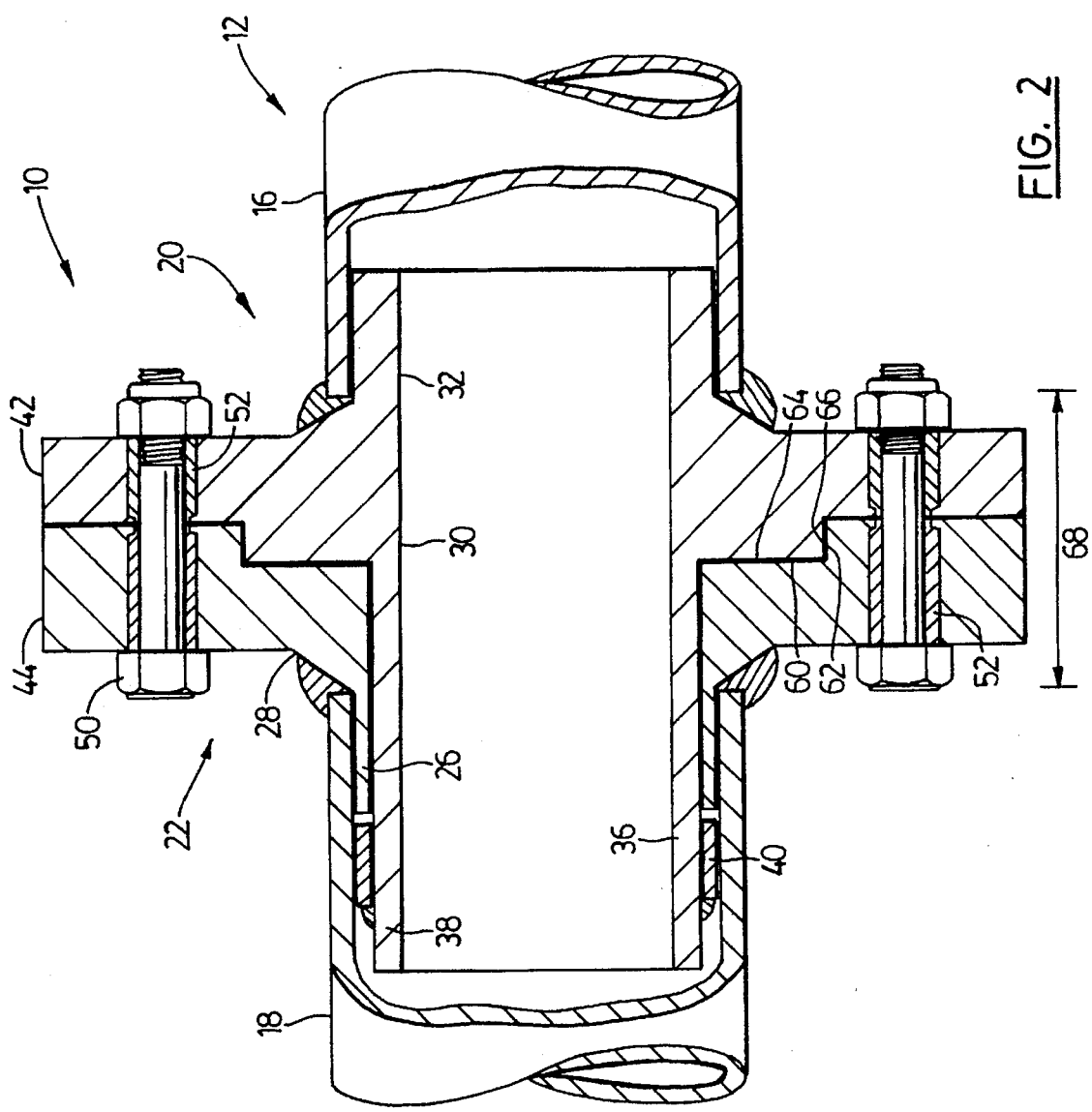
FIG. 2 a sectional view of the connected coupling device joined to the drive shaft sections.

FIGS. 1 and 2 show a coupling device, generally indicated by the reference numeral 10, for connecting two ends of a hollow drive shaft 12 which is rotatable about a longitudinal axis 14. The coupling device may be "factory installed" on a drive shaft, or an existing (i.e. "used") drive shaft may be cut and a segment removed to accommodate the coupling device (i.e. "retro-fit"). In either case, the drive shaft 12 will have first and second sections 16 and 18, respectively, aligned along the axis 14. In the preferred embodiment, the coupling device 10 is intended for use in heavy duty trucks with drive shafts which may attain up to 2500 r.p.m. and which frequently snap due to excessive loads, such as those caused by sudden engine acceleration. However, the coupling device may likewise be mounted on various other drive shafts ranging from automobiles to relatively low r.p.m. agricultural machinery, such as tractors and agricultural attachments.

The coupling device 10 has two coupling members: a first coupling member 20 for connection to the end of the first drive shaft section 16; and a second coupling member 22 for connection to the second drive shaft section 18. As will be explained later, the coupling members and the shaft sections may be secured together by welded connections or equivalent means. The second coupling member 22 has a hollow hub or central opening 24 and a laterally projecting sleeve 26 for engaging the end of the second drive shaft section 18. The sleeve 26 is insertable into the hollow interior of the second drive shaft section 18 and is preferably sized for a snug fit. The second drive shaft section 18 fits over the sleeve 26 so that the shaft end abuts a radially inclined surface 28 of the coupling member 22 where the shaft and coupling member may be welded together. The incline of the surface 28 is intended to facilitate welding and enhance the welded connection. The sleeve may be adapted for insertion over the end of the second drive shaft section 18, but this is not preferred because the outside surface of used drive shafts is normally rusty and presents insertion and welding difficulties.

The first coupling member 20 has a hollow hub 30. The hub 30 need not be hollow, but this is not preferred because it would add needless weight to the coupling device. The hub 30 has a first portion 32 which engages the first drive shaft section 16 in a similar manner as the sleeve 26, namely by insertion into the hollow interior of the first shaft section. The end of the first shaft section 16 abuts a radially inclined surface 34 where the shaft is secured to the first hub portion 32 by welding. The first hub portion 32 may also be adapted for insertion over the end of the first drive shaft section 16, but this is not preferred for reasons noted above. It will be appreciated by those skilled in the art that in an alternate embodiment the shaft section 16 may be pre-fabricated integrally with the coupling member 20. The shaft section 16 would simply extend directly from the hub 30, thus omitting the weld along the inclined surface 34.

The hub 30 has a second portion 36 opposite the first hub portion 32 which fits into the central opening 24 of the second coupling member 22 with a radial clearance of about 5/1000 inch (about 0.125 mm). The clearance should be sufficient to allow smooth rotation of the first coupling member 20 relative to the second coupling member 22 upon overload of the device. The axial length of the second hub portion 35 should be sufficient so that its end (identified as end piece 38) projects beyond the end of the sleeve 26 to receive a collar or ring 40 when the first and second coupling members 20, 22 are joined together. The collar 40 is insertable onto the end piece 38 and is secured thereto, preferably by welded connection, to stop the first and second coupling members 20, 22 from separating upon overload by restricting, axial movement of the second hub portion 36 relative to the sleeve 26. The end piece 38 should extend beyond the collar 40 to provide a lip for the welded connection, and the collar's outer diameter should be no larger than that of the sleeve 26 to avoid obstructing the insertion of the second drive shaft section 18 onto the sleeve 26. An axial clearance of about 5/1000 inch (about 0.125 mm) may be provided between the welded collar 40 and the sleeve 26. Hence, axial movement or travel along axis 14 between both coupling members is restricted to the mount of such clearance upon overload.

The first and second coupling members 20, 22 have first and second radially extending flanges 42 and 44, respectively, which abut each other when the coupling members are joined together. The first and second flanges 42, 44 have axially alignable apertures 46 and 48, respectively. Each pair of apertures 46, 48 receives a coupling bolt or pin 50 for joining or connecting the coupling members 20, 22. The bolts 50 should transfer some or all of the torque between the coupling members 20, 22, depending on the mount of friction established between the joined coupling members. Naturally, the type, size and number of bolts used will determine the available coupling force between the coupling members 20, 22 and the maximum torque which may be transferred. At least two pairs of apertures 46, 48 are provided, the pairs of apertures being evenly spaced circumferentially for balanced rotation, namely to avoid eccentricities which might cause the device to vibrate or wobble during operation of the drive shaft. For example, if four pairs of apertures are used, they should be circumferentially spaced at fight angles to one another.

Each of the apertures 46, 48 is provided with a removable annular insert or lining 52 which defines or determines the maximum size of bolt 50 which may be used. Although a bolt smaller than that defined by the insert may be used, preferably the bolt and insert diameters are closely matched to establish a snug fit and avoid undesirable shifts or movements of the bolt in the aperture operation. In the preferred embodiment the inserts are flush with the exterior surfaces of the flanges as shown. Each aperture 46, 48 has a tab or stop 54 and 56, respectively, adjacent the interior surfaces of the coupling members 20, 22, and each insert has a correspondingly shaped recess 58 for contacting the tab 54, 56 and for locating the insert in the aperture.

The coupling device 10 is provided with a means of maintaining the first and second shaft sections 16, 18 in axial alignment during operation and particularly upon overload (i.e. upon rupture or shearing of the bolts 50). Although location of the second hub portion 36 within the central opening 24 may be adequate to retain the drive shaft sections in alignment, further retaining means are provided, namely an annular groove or channel 60 extending radially from the central opening 22 of the second coupling member 22 which receives a correspondingly shaped annular projection 64 extending radially from the second hub portion 36 of the first coupling member 20. The groove 60 forms a shoulder 62 with the second flange 44 and the projection 64 forms a lip 66 with the first flange 42. The clearance between the shoulder 62 and lip 66 should be comparable to that of the second portion 36 in the opening 24 as noted earlier. Upon rupture of the bolts 50, the lip 66 will bear upon the shoulder 62 as the projection 64 rotates within the groove 60. The groove 60 therefore forms a kind of track for the rotating projection 64. A grease nipple (not shown) may be located in one of the flanges to provide access for a lubricant to the interface area of the groove and projection. It will be appreciated that to prevent the lip 66 from disengaging with the shoulder 62 upon overload, the width or overlap of the shoulder 62 and lip 66 should be greater than the earlier discussed travel allowed between the collar 40 and the sleeve 26.

It can now be appreciated how the preferred embodiment of the present invention is installed and operates. A space must first be provided intermediate the ends of a continuous drive shaft, say a heavy duty truck shaft, to accommodate the coupling device 10. This will either be done as a step in manufacturing a new truck, or after manufacture of the truck (for example, retro-fitting the device onto the drive shaft of a used truck). When retro-fitting, the cut-out piece of drive shaft should normally provide a space (indicated by 68 in FIG. 2) no less than the distance between the inclined surfaces 28 and 34 when the device is bolted together. The collar 40 should already be secured to the end piece 38 when the first drive shaft section 16 is inserted onto and secured to the first hub portion 32, and the second shaft section 18 is inserted over the collar 40 onto the sleeve 26 and secured thereto. The flanges 42, 44 are then rotated (about the axis 14) to align apertures 46, 48, and the coupling members 20, 22, are connected via bolts 50. It will be apparent that the coupling members 20, 22 may be connected prior to securing the shaft sections to the coupling device. The size of bolt 50 and insert 52 will also be pre-selected based on the desired overload condition, namely the torque at which the bolts 50, and not the drive shaft sections, will rupture. Hence, an advantage of the present invention is the ease of installation of the coupling device on a drive shaft In operation, the coupling device will rotate in unison with the drive shaft sections 16, 18 about the common longitudinal axis 14. Upon the drive shaft encountering an overload condition, the bolts 50 will rupture (i.e. shear) and allow the first and second coupling members 20, 22 to freely rotate relative to each other, thus ceasing transference of torque between the shaft sections 16, 18 while maintaining alignment of the shaft sections along axis 14. Another advantage of the present invention is that it prevents collapse of the shaft sections upon such overload. Working engagement between the drive shall sections is easily re-established by merely replacing the ruptured bolts with new one. A single user may quickly perform such replacement because the drive shaft sections need not be lifted or supported. The coupling members 20, 22 need only be spun to align the apertures 48 for insertion of the new bolts. Towing of the truck and expensive replacement of the entire drive shall is thus avoided.

The above description is intended in an illustrative rather than a restrictive sense and variations to the specific configurations, described may be apparent to skilled persons in adapting the present invention to specific applications. Such variations are intended to form part of the present invention insofar as they are within the spirit and scope of the claims below. For instance, the device may be adapted for use in vertically oriented shafts rather than the generally horizontal drive shaft discussed above. The coupling device may be sized to fit a variety of drive shafts, such as those of heavy duty trucks whose outer diameter ranges in size from 3 inches (about 76 mm) to 6.5 inches (about 165 mm).

We claim:

1. A device for connecting the ends of first and second aligned sections of a hollow drive shaft rotatable about a common axis, said device comprising:

a first coupling member for securing to the end of said first drive shaft section and a second coupling member for securing to the end of said second drive shaft section wherein:

said second coupling member has a central opening and a laterally projecting sleeve for engaging said second drive shall section; and said first coupling member includes a hub having:

a first hub portion for engaging said first drive shaft section; and a second hub portion opposite said first hub portion which extends through said central opening and has an end piece which projects beyond said sleeve of the second coupling member and into said second shaft section;

at least two shearable connectors for connecting said first and second coupling members and for transmitting torque between said first and second drive shaft sections during operation, said connectors arranged for balanced common rotation of said first and second coupling members, and wherein said connectors, and not the drive shaft sections, will rupture when said coupling members are subjected to an overload condition; and said first and second coupling members further including:

retaining means for maintaining said first and second shaft sections in axial alignment upon rupture of said connectors, said first and second coupling members being relatively rotatable about said common axis upon said rupture; and stop means for preventing collapse of said shaft sections by restricting relative axial movement of said coupling members upon rupture of said connectors.

2. The device of claim 1 wherein said stop means comprises a collar insertable onto and securable to said end piece of the second hub portion for restricting axial movement of the second hub portion relative to said sleeve.

3. The device of claim 2 wherein said collar is secured upon said end piece by means of a welded connection.

4. The device of claim 3 wherein said end piece of the second hub portion extends beyond said collar to accommodate said welded connection.

5. The device of claim 2 wherein said collar and said sleeve of the second coupling member are insertable into said second hollow shaft section.

6. The device of claim 2 wherein said retaining means includes an annular groove extending radially from said central opening of the second coupling member which receives a correspondingly shaped annular projection extending radially from said second hub portion of the first coupling member, said groove forming a track for rotation of said projection within said groove upon rupture of said connectors.

7. The device of claim 6 wherein said projection axially overlaps into said groove and an axial clearance is provided between said collar and said sleeve of the second coupling member, said overlap being greater than said clearance.

8. The device of claim 1 wherein said first hub portion of the first coupling member is insertable into said first hollow drive shaft section.

9. The device of claim 1 wherein said retaining means includes an annular groove extending radially from said central opening of the second coupling member which receives a correspondingly shaped annular projection extending radially from said second hub portion of the first coupling member, said projection bearing upon and rotating within said groove upon rupture of said connectors.

10. The device of claim 1 wherein said first and second coupling members have radially extending flanges in abutting relationship, said flanges having axially alignable apertures for receiving said connectors.

11. The device of claim 10 wherein said flange apertures are evenly spaced about the circumference of said flanges to provide said balanced rotation of said device during operation.

12. The device of claim 11 wherein each of said flange apertures is provided with a removable insert which defines the maximum size of said connectors receivable therein.

13. A coupling device for establishing a shearable driving connection between a first drive shaft section and a second drive shaft section comprising:

(a) a first coupling member adapted to be secured to said first drive shaft section;

(b) a second coupling member adapted to be secured to said second drive shaft section;

(c) means for connecting said first coupling member with said second coupling members for balanced rotation to at least 2500 r.p.m. about an axis common to both said first and second drive shaft sections, said connecting means adapted to shear upon said coupling members being subjected to a predetermined overload condition;

(d) said first and second coupling members further including:

(i) retaining means for maintaining said first and second shaft sections in axial alignment upon shearing of said connecting means; and (ii) stop means to maintain said coupling members in an abutting relationship and to prevent collapse of said shaft sections upon shearing of said connecting means, said stop means comprising a collar secured to said first coupling member to restrict relative axial movement of said coupling members upon shearing of said connecting means, wherein said second coupling member is located intermediate said collar and said first drive shaft section.

14. The coupling device of claim 13 wherein said collar is adapted to be located within said second drive shaft section.

15. The coupling device of claim 13 wherein said first and second coupling members each have a hub portion and a radially extending flange therefrom, said connecting means comprising a plurality of shearable connectors evenly spaced circumferentially about each of said flanges.

* * * * *